ELLIS & WHITE.

Cartridge.

No. 1,529. Reissued Aug. 25, 1863.

Witnesses:
J. W. Coombs
G. W. Reed to E. H. Plant
H. Reynolds
A. P. Plant
A. Hotchkiss Inventors:
W. C. Ellis
J. N. White Assignors
Per Munn & Co
Attorneys.

M. PETERS, PHOTO-LITHOGRAPHER, WASHINGTON, D. C.

UNITED STATES PATENT OFFICE.

EBENEZER H. PLANT, HENRY REYNOLDS, AMZI P. PLANT, AND ALFRED HOTCHKISS, OF NEW HAVEN, CONNECTICUT, ASSIGNEES OF WILLARD C. ELLIS AND JOHN N. WHITE.

IMPROVEMENT IN METALLIC CARTRIDGES.

*Specification forming part of Letters Patent No.* 24,726, *dated July* 12, 1859; *reissue No.* 1,529, *dated August* 25, 1863.

DIVISION B.

*To all whom it may concern:*

Be it known that WILLARD C. ELLIS and JOHN N. WHITE, both of Springfield, in the county of Hampden and State of Massachusetts, have invented a new and useful Improvement in Fire-Arms; and we, EBENEZER H. PLANT, of New Haven, in the county of New Haven and State of Connecticut; HENRY REYNOLDS, of Springfield aforesaid; AMZI P. PLANT, of Southington, in the county of Hartford and State of Connecticut, and ALFRED HOTCHKISS, of Southington aforesaid, assignees of Letters Patent obtained by said ELLIS and WHITE for said invention, do hereby declare that the following is a full, clear, and exact description of the same, reference being had to the accompanying drawings forming part of this specification.

The principal object of this invention is to provide for the loading of revolving fire-arms in front of the cylinder with metallic cartridges carrying their own priming; and to this end it consists in the construction of such a cartridge with a hollow flange around the rear of its metallic shell projecting backward, parallel or nearly so with the length of the cartridge, and having an external circumference no greater than that of the rest of the shell, such flange to contain a fulminating priming which may be fired by the hammer of the fire-arm striking through a suitable opening provided in the rear of each chamber of the cylinder. The cartridge so constructed is also applicable to breech-loading fire-arms as well as to revolvers.

Figure 1:
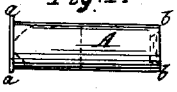
Figure 2:
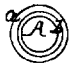
Figure 3:
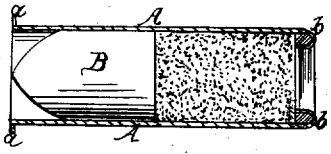

Figure 1 in the accompanying drawing is an outside longitudinal view of a cartridge constructed according to my invention. Fig. 2 is a rear end view of the same. Fig. 3 is a central longitudinal section of the same on a larger scale than Figs. 1 and 2.

Similar letters of reference indicate corresponding parts in the several figures.

A is the shell, of copper or other suitable metal, represented as of a length sufficient to contain the charge and the whole of the ball B, and to fill the whole length of the chamber, and with a flange, *a*, at its front end to lap over the edges of the mouth of the chamber, to enable it to be laid hold of with the thumb and finger to withdraw it from the chamber after its discharge. This flange is not, however, indispensable, as it may be pushed out from the cylinder by an instrument inserted through an opening in the rear thereof; but it is better that the shell be of the full length of the chamber, that it may be effectually prevented from any longitudinal movement therein, and confined closely to the rear thereof by the barrel and portion of the frame in front of the cylinder. *b* is the hollow flange, which is formed around the rear of the shell to contain the fulminating priming, such flange having an external circumference no greater than that of the remainder of the shell, and projecting only backward in a direction parallel with the length of the cartridge.

The fire-arm in which this cartridge is to be used must have the rear portion of its chamber or chambers so constructed that while partially closed to prevent the cartridge from slipping through and to support it against recoil, the hammer may enter to strike the flange and explode the fulminating priming. The hammer may strike either on the inside or outside of the flange, but if arranged to strike on the outside there should be an inward and forward projection on the rear of the chamber to enter the cavity *c*, that is formed within the flange, and thereby support the latter against the blow of the hammer and insure the explosion of the priming.

What we claim as the invention of WILLARD C. ELLIS and JOHN N. WHITE, and desire to secure by Letters Patent, is—

The hollow flange *b*, projecting from the rear of the shell in a backward direction, parallel, or nearly, with the length of the cartridge, substantially as and for the purpose herein specified.

EBENEZER H. PLANT.
HENRY REYNOLDS.
AMZI P. PLANT.
ALFRED HOTCHKISS.

Witnesses:
J. W. MANSFIELD,
SAML. B. GORHAM.